United States Patent
Arcese et al.

(10) Patent No.: US 8,543,979 B2
(45) Date of Patent: *Sep. 24, 2013

(54) METHOD AND SYSTEM FOR CHECKING THE CONSISTENCY OF APPLICATION JAR FILES

(75) Inventors: Mauro Arcese, Rome (IT); Luigi Pichetti, Rome (IT); Stefano Sidoti, Rome (IT)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/450,382

(22) Filed: Apr. 18, 2012

(65) Prior Publication Data

US 2012/0317546 A1    Dec. 13, 2012

Related U.S. Application Data

(63) Continuation of application No. 13/157,467, filed on Jun. 10, 2011.

(51) Int. Cl.
G06F 9/44    (2006.01)
G06F 9/445    (2006.01)

(52) U.S. Cl.
USPC ........... 717/120; 717/122; 717/168; 717/169; 717/170; 717/174; 717/175

(58) Field of Classification Search
None
See application file for complete search history.

(56) References Cited

U.S. PATENT DOCUMENTS

| | | | |
|---|---|---|---|
| 5,898,836 A * | 4/1999 | Freivald et al. | 709/218 |
| 5,999,740 A | 12/1999 | Rowley | |
| 6,026,237 A * | 2/2000 | Berry et al. | 717/130 |
| 6,148,340 A * | 11/2000 | Bittinger et al. | 709/224 |
| 6,526,574 B1 * | 2/2003 | Jones | 717/168 |
| 7,127,712 B1 | 10/2006 | Noble et al. | |
| 7,539,978 B1 * | 5/2009 | Haddox et al. | 717/130 |
| 7,694,293 B2 * | 4/2010 | Rao | 717/172 |
| 7,818,736 B2 * | 10/2010 | Appavoo et al. | 717/168 |
| 8,230,413 B2 * | 7/2012 | Bates et al. | 717/166 |
| 2002/0143522 A1 * | 10/2002 | Storisteanu et al. | 704/1 |
| 2004/0103412 A1 | 5/2004 | Rao et al. | |
| 2004/0123279 A1 | 6/2004 | Boykin et al. | |
| 2004/0153996 A1 | 8/2004 | Boykin et al. | |
| 2004/0230949 A1 | 11/2004 | Talwar et al. | |

(Continued)

OTHER PUBLICATIONS

IBM, WebSphere Application Server V7: Understanding Class Loaders, 1-34 pages, copyright 2009.*

(Continued)

*Primary Examiner* — Insun Kang
(74) *Attorney, Agent, or Firm* — Hamilton, Brook, Smith & Reynolds, P.C.

(57) ABSTRACT

A computer method and system dynamically provide consistency of JAVA application files. A processor executed routine is configured (e.g., instrumented as an agent) to intercept each class that is loaded into a subject JAVA application or JVM. The system computes a cyclic redundancy check (CRC) of the respective JAR file surrounding the loaded class. The system compares the computed CRC value to a CRC value of at least one other copy of the respective JAR file. Based on the comparison, the system determines consistency (e.g., same version) of the multiple copies of the respective JAR file used by the subject Java application. If the multiple copies of the respective JAR file are determined to be inconsistent, the system alerts the user and/or enables the application to abort.

10 Claims, 5 Drawing Sheets

(56) References Cited

U.S. PATENT DOCUMENTS

| | | | |
|---|---|---|---|
| 2005/0222968 A1* | 10/2005 | Wayman | 707/1 |
| 2006/0041880 A1* | 2/2006 | Martin et al. | 717/166 |
| 2006/0101310 A1* | 5/2006 | Diamant et al. | 714/38 |
| 2006/0130046 A1 | 6/2006 | O'Neill | |
| 2007/0061372 A1* | 3/2007 | Appavoo et al. | 707/200 |
| 2007/0106716 A1* | 5/2007 | Corrie | 707/206 |
| 2007/0169110 A1 | 7/2007 | Gupta et al. | |
| 2007/0240154 A1* | 10/2007 | Gerzymisch et al. | 717/174 |
| 2007/0244987 A1 | 10/2007 | Pedersen et al. | |
| 2008/0229299 A1 | 9/2008 | Martin et al. | |
| 2009/0037835 A1 | 2/2009 | Goldman | |
| 2009/0106747 A1* | 4/2009 | Arcese | 717/166 |
| 2009/0172636 A1* | 7/2009 | Griffith et al. | 717/113 |
| 2010/0131478 A1* | 5/2010 | Bauchot et al. | 707/695 |
| 2010/0180343 A1 | 7/2010 | Maeda et al. | |
| 2010/0199259 A1* | 8/2010 | Quinn et al. | 717/106 |
| 2011/0010345 A1* | 1/2011 | Forster et al. | 707/661 |
| 2011/0265071 A1* | 10/2011 | He | 717/168 |
| 2012/0254848 A1* | 10/2012 | Robertson et al. | 717/166 |
| 2012/0317563 A1 | 12/2012 | Arcese et al. | |

OTHER PUBLICATIONS

Luo, "JAR File Fingerprinting Techniques," Oct. 2010.*

Sosnoski, "Java programming dynamics, Part 5: Transforming classes on-the-fly," Feb. 3, 2004.*

"The Java Language Specification," http://java.sun.com/docs/books/jls, downloaded May 10, 2011.

"J2EE v1.4 Documentation," http://java.sun.com/j2ee/1.4/docs/, downloaded May 10, 2011.

"OSGi Alliance Specifications," http://www.osgi.org/Specifications/HomePage, downloaded May 10, 2011.

"Cyclic redundancy check," http://en.wikipedia.org/wiki/Cyclic_redundancy_check, downloaded May 10, 2011.

* cited by examiner

METHOD AND SYSTEM FOR CHECKING THE CONSISTENCY OF APPLICATION JAR FILES

RELATED APPLICATION

This application is a continuation of U.S. application Ser. No. 13/157,467, filed Jun. 10, 2011. The entire teachings of the above application are incorporated herein by reference.

BACKGROUND

The present invention relates to JAVA Archive Files, and more specifically, to the JAVA Programming language.

The JAVA Programming language provides a convenient means for packaging and distributing applications using JAVA Archive Files (JAR). These files can be used to deliver and directly run JAVA applications and applets.

With the ever growing complexity of enterprise Java applications, often an entire application is split into several pieces that may run in parallel and potentially also on different nodes (a User Interface module, a back-end module, a Command Line Interface module, and so on). In such circumstances it may happen that a common set of JAR files are required to run all such modules, but for constraints given by the runtime, it may not be possible to directly reference just one copy of the JAR files.

This means that multiple copies of the same JAR file may be necessary even on the same physical node and this poses some issues when an application has to be updated.

If the update process is not correctly performed it may happen that not all the copies of a given JAR file get updated resulting in unpredictable behaviors of the application. Since the application delivery/packaging and the patch delivery/packaging operations are in general done by different teams and considering the complexity of an enterprise application (especially those that run in a J2EE and/or OSGi container), it is not so infrequent that such issues happen.

In the pertinent field, there are several tools and systems for upgrading an application, but none of them has specific mechanisms for coping with the issue described so far. They in general assume that who prepares the packaging knows exactly what has to be included in the patch and where it has to be replaced.

BRIEF SUMMARY

According to embodiments of the present invention, this disclosure describes a system and a method for coping with the issues described above. More specifically it proposes a system that is able to detect any "wrong" update of an installation by ensuring that all the copies of the same JAR file are the same and correspond to the desired version. In case any copy of the JAR files is not at the correct level (version), the system generates a proper notification.

The system is based on a mechanism that exploits the JRE (JAVA Runtime Environment) Instrumentation interface. As soon as a JAVA class gets loaded into the JVM, the invention system (i) retrieves the enclosing JAR file and (ii) verifies its CRC (cyclic redundancy check) against a desired value taken from a master and global configuration. If the two values differ then a notification gets generated and optionally the application may be aborted (either softly or hardly).

In embodiments, the same mechanism, with little modifications, can be extended to check that all the copies of a JAR file are the same regardless of the fact that a desired one has been specified to check against.

Such a mechanism is something that can be added on top of an already written application without any need to modify that application.

The main advantage of the invention system is that it allows the immediate detection of an upgrade operation completing successfully or, more generally, of any application JAR file, present in multiple copies, being corrupt for any reason.

Embodiments include a computer method and system providing consistency of JAVA application files. The method and system comprise a processor (executing a routine) that:

automatically intercepts a class that is loaded into a subject JAVA application, the class having a respective JAR file;

computes cyclic redundancy check of the respective JAR file resulting in a computed CRC value;

compares the computed CRC value to a CRC value of at least one other copy of the respective JAR file; and based on results of the comparing, determines consistency (exact sameness and/or correspondence to the same version) of multiple copies of the respective JAR file used by the subject JAVA application. Embodiments alert (e.g, issue a notification to) a user when the multiple copies of the respective JAR files are determined to be inconsistent. In this way, the invention method and system dynamically ensure consistency of the subject JAVA application files.

The subject JAVA application may be composed by multiple running JAVA virtual machines. Different JAVA virtual machines may reference different copies of the same JAR files. In embodiments, the step of automatically intercepting is applied to each class that is loaded into the subject JAVA application, each class having a respective JAR file. In one embodiment, the processor routine employs an agent registered to intercept each class, the agent being defined through the JRE Instrumentation interface.

In embodiments, the CRC value of the one other (comparative) copy of the respective JAR file is stored in a repository. The invention system/method looks up the stored CRC value in the repository, and compares the computed CRC value to the stored CRC value as looked-up in the repository. In some embodiments, comparing the computed CRC value is with respect to a pre-specified CRC value, the CRC value of the at least one other copy of the respective JAR file being the pre-specified CRC value. And in other embodiments, comparing the computed CRC value is relative to CRC values of the multiple copies of the respective JAR file.

In embodiments, the step of determining consistency determines when the multiple copies of the respective JAR file are inconsistent and aborts the subject application. In other embodiments, the step of determining consistency determines when the multiple copies of the respective JAR file are inconsistent and notifies the subject Java application (i.e. to abort, to warn the user, to update files, etc.).

In accordance with another aspect of the present invention, embodiments determining consistency further provide immediate detection of updates having been uniformly performed on the multiple copies of the respective JAR file. In other embodiments, determining consistency further provides immediate detection of corruption of at least one of the multiple copies of the respective JAR file.

BRIEF DESCRIPTION OF THE SEVERAL VIEWS OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

Figure 1:
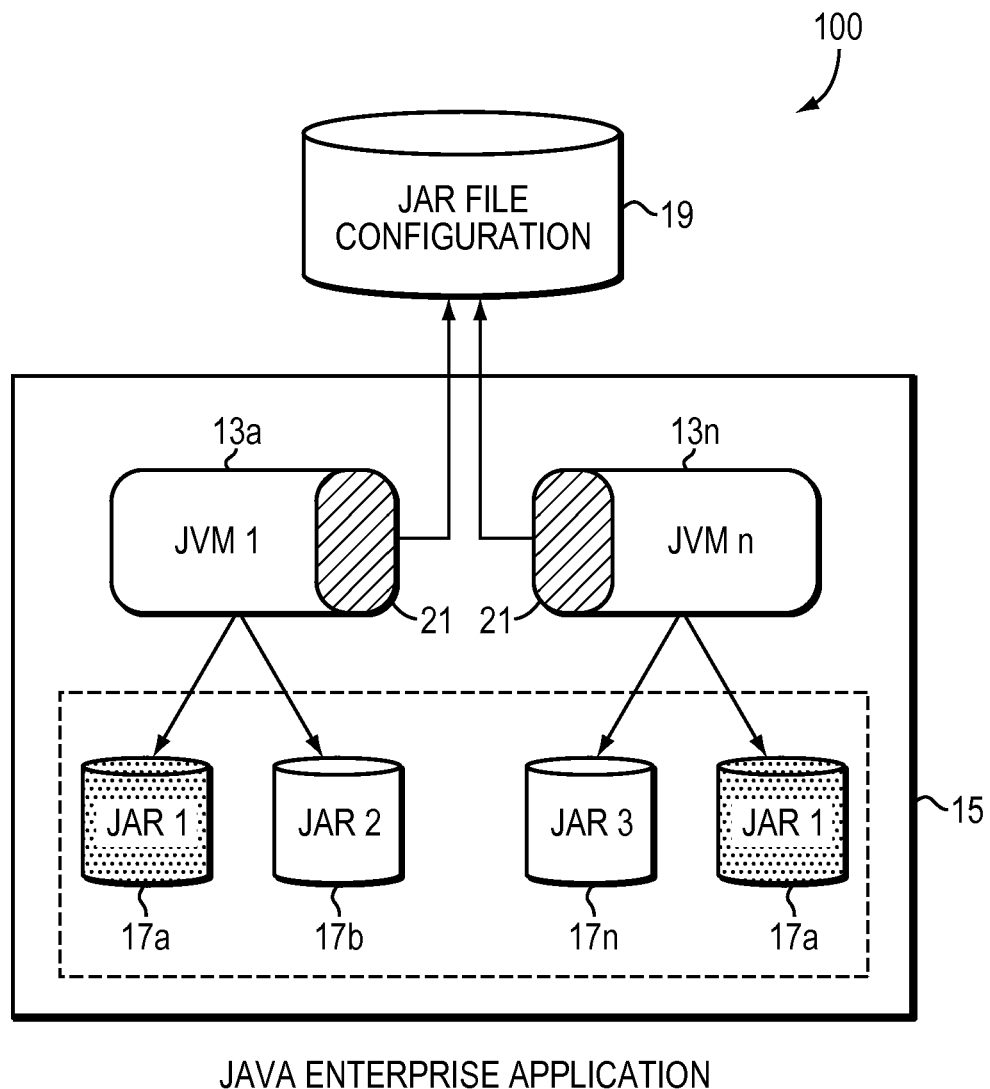
FIG. 1 is a block diagram of one embodiment of the present invention.

With reference now to FIG. 1, an exemplary, non-limiting system 100 embodying the present invention is shown and described. The idea, proposed in this disclosure, is to exploit the instrumentation interface provided by the most recent versions of the Java Virtual Machines (JVM) 13 to intercept each class that is being loaded into the JVM. Applicants propose a component called "Jar version detector" 21 that is started in the JVM 13 for handling such events. Each Java Virtual Machine 13a, b . . . n belonging to the same application 15 gets started with a respective Jar version detector engine 21 enabled and referencing a common Jar File Configuration repository 19. The depiction of FIG. 1 represents a single enterprise application 15 composed by several running JVMs 13a, b . . . n, and part of the JVMs 13 reference different copies of the same JAR file 17 (i.e., Jar 1).

Figure 2:
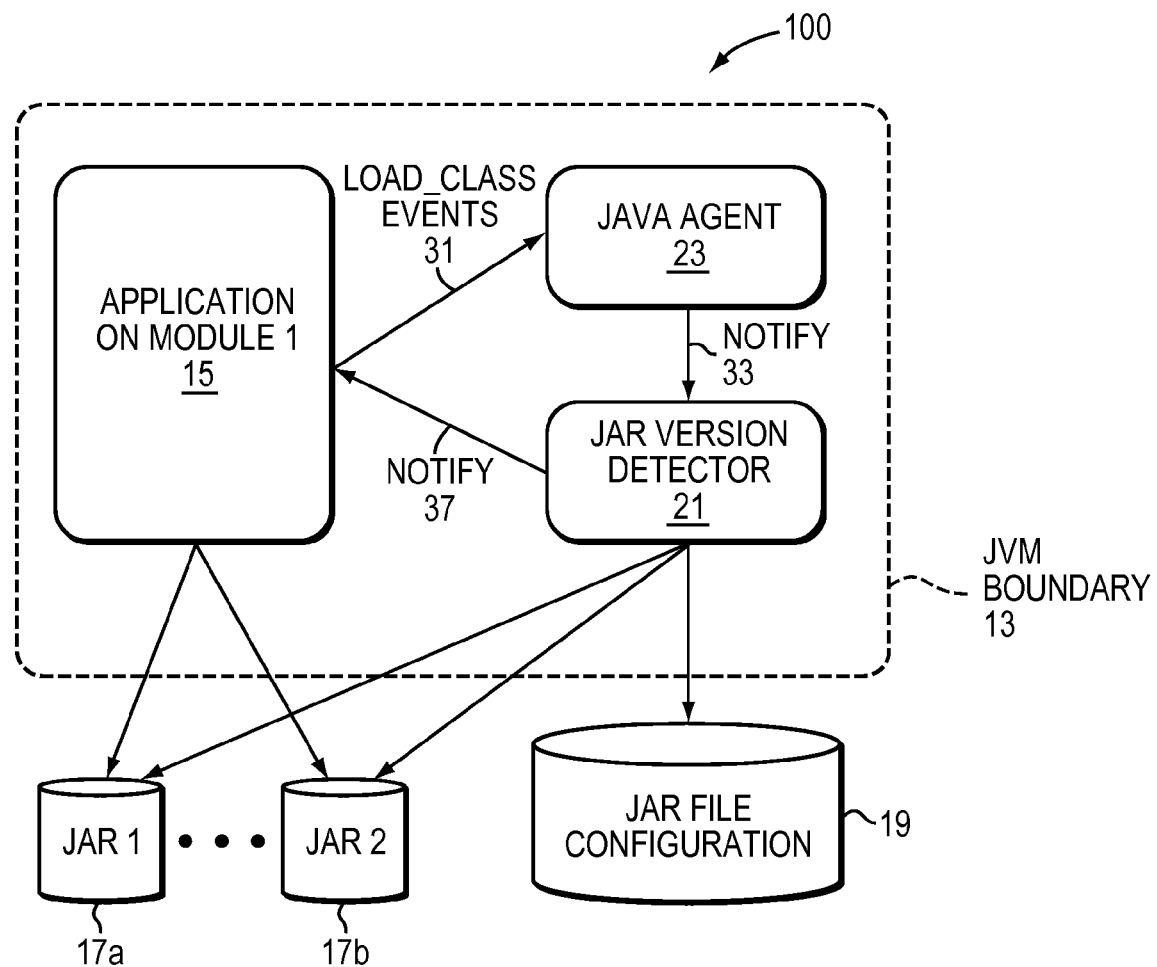
FIG. 2 is a schematic view of operation of embodiments of the present invention.

As illustrated in FIG. 2, a specific Java agent 23 (along with Jar version detector engine 21) is registered within each application's JVM 13 at its startup. This can be achieved by leveraging the –javaagent CLI (Command Line Interface) option available in the JAVA Runtime Environment (JRE). The JAVA agent 23 (along with JAVA version detector engine 21) is registered to intercept each class that is being loaded by the JAVA Virtual Machine 13. Upon intercepting such events, the agent 23 notifies the Jar version detector engine 21 that in turn takes care of performing all the necessary checks on the class and its enclosing JAR file 17a,b . . . n.

In more details, the flow of events occurring in the context of this system 100 are as follows:

Step 1—A new class gets loaded into the JVM 13. This is illustrated at 31 in FIG. 2.

Step 2—The Java agent 23 intercepts this event 31 and notifies the Jar version detector 21 at 33 in FIG. 2.

Step 3—Upon receiving the notification 33, the Jar version detector 21 calculates or otherwise identifies the JAR file 17 containing the class that is being loaded. This is achieved, for example, with some logic built around the following code snippet:

File jarFile=new File
(protectionDomain.getCodeSource( ).getLocation( ).toURI( ));

where 'protectionDomain' is a context attribute passed by the JVM 13 to the JAVA agent 23 and, in turn, to the Jar detector engine 21.

In those cases where the JAR file 17 information is not available (for example if a special class loader has been implemented for dynamically generating a class file or for retrieving it from a custom data source), the system 100 skips analyzing the class and eventually logs a warning.

Step 4—The Jar version detector 21 checks if this is the first time that the identified JAR file 17 has been encountered. If it is the case, then Jar version detector 21 calculates the CRC (Cyclic Redundancy Check) of the JAR file 17 using common techniques. Alternatively in some embodiments, JAR version detector 21 does nothing and just releases the control to the JVM 13.

If this is not the first time that the JAR file 17 is referenced, the Jar version detector 21 looks-up the JAR file 17 corresponding data as stored in Jar File Configuration repository 19. At the repository entry present for the current JAR file 17, Jar version detector 21 obtains the associated CRC and compares that stored CRC value to the one currently calculated for the actual JAR file 17. If the two values do not match, then Jar version detector 21 sends a notification 37 to the application 15 for alerting it about this situation.

If properly designed to handle such notifications 37, the application 15 may decide to take appropriate actions. Appropriate actions include any of the following: completely aborting the application operations, or just alerting the user about this situation, or scheduling a software update for the back-level jar component, or the like.

Alternatively, if the application 15 has not been designed to directly handle such situations, it could directly be the Jar version detector 21 that aborts the application 15 processing or warns the administrator.

All the above steps occur for each JVM 13 process comprising the Enterprise Application 15. In that way, the invention method and system 100 automatically and dynamically provide consistency of JAR files 17 in multiple copies, or generally of JAVA application files.

In the descriptions of the above events it has been assumed, as a prerequisite, that the Jar File Configuration repository 19 has already been filled with appropriate information about the JAR files 17 that have to be checked. Storing such JAR files 17 data in repository 19 should usually be done when installing/upgrading the application 15. The information contained in such repository 19 is a list of key-value pairs, where the key is the full name of the JAR file 17 and the value is the corresponding CRC (Cyclic Redundancy Check). Other data configurations for repository 19 are suitable.

Even if not explicitly described, the same system 100, with little modifications, could potentially be used to check that all copies of a JAR file 17 are the same regardless of the fact that a desired one has been specified in the configuration repository 19. The main difference is that when processing a JAR file 17 for the first time, the system 100 computes its CRC and stores that CRC value in the common repository 19 instead of looking it up assuming that someone in advance already registered the CRC value. Then everything else (above described steps of FIG. 2) remains the same.

As an implementation detail, the entire system 100 can be packaged into a single .jar file and registered into any JVM 13 through the –javaagent JRE option (such as mentioned above at agent 23). Such registration mechanism allows one to integrate this system 100 into any already written Java application 15 without the need to modify it. A system-aware application would have the additional advantage of being able to directly handle any notification generated by the system 100 instead of relying just on system conclusions/decisions.

Figure 4:
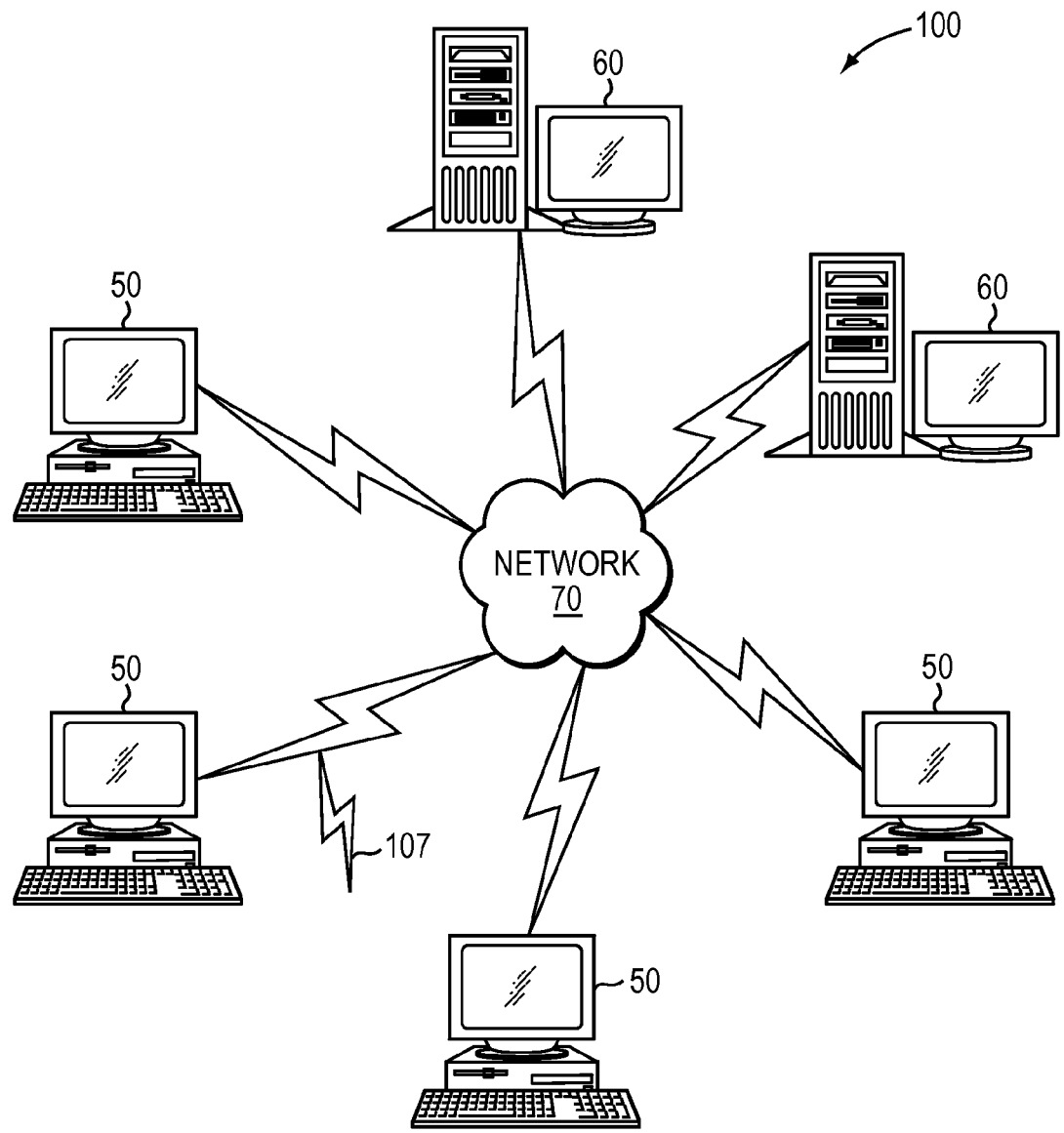
FIG. 4 is a schematic view of a computer network deploying embodiments of the present invention.

FIG. 4 illustrates a computer network or similar digital processing environment in which the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 5:
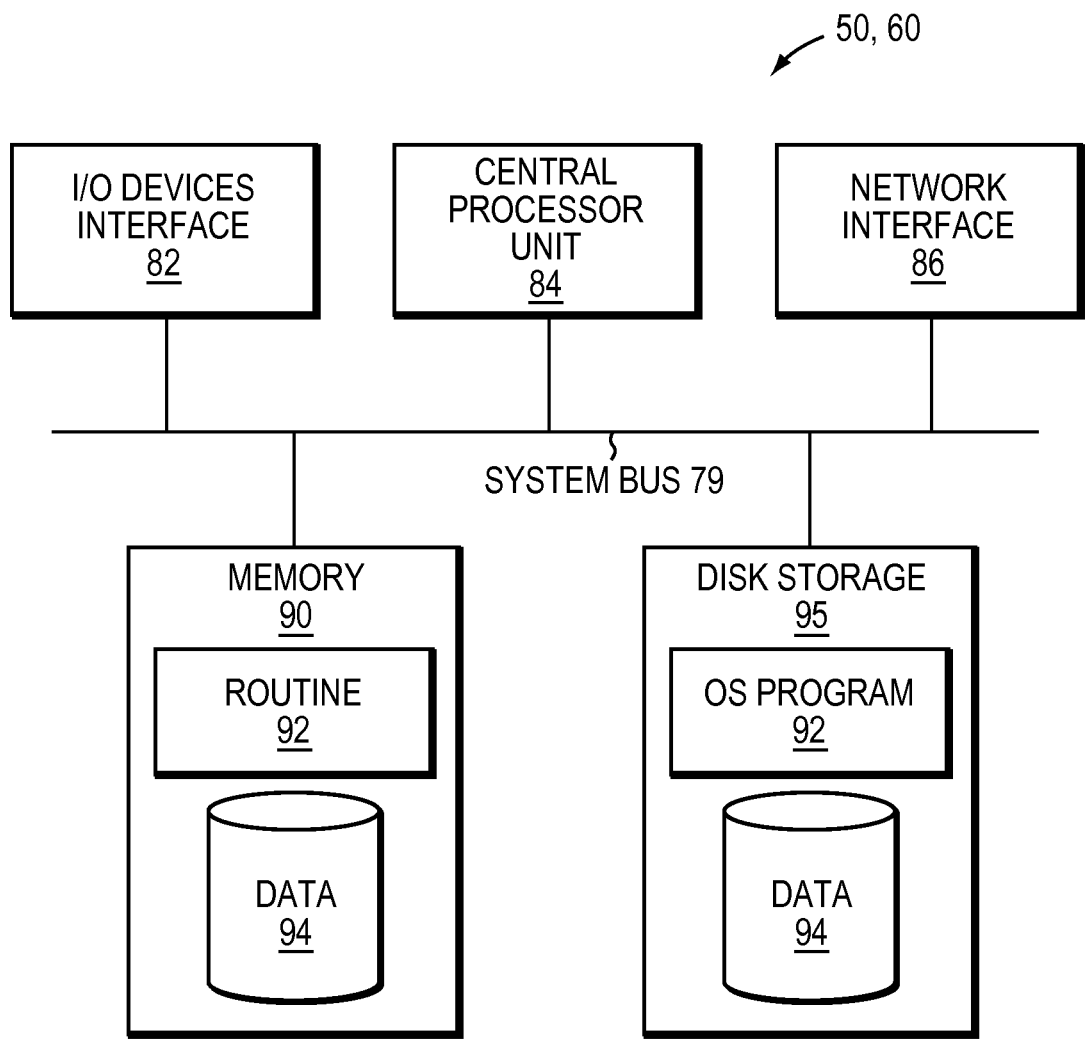
FIG. 5 is a block diagram of a computer node in the network of FIG. 4.

FIG. 5 is a diagram of the internal structure of a computer (e.g., client processor/device 50 or server computers 60) in the computer system of FIG. 4. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 4). Memory 90 provides volatile storage for computer software instructions 92 and data 94 used to implement an embodiment of the present invention (e.g., Jar version detector 21, system 100 and supporting code detailed above and below). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 3:
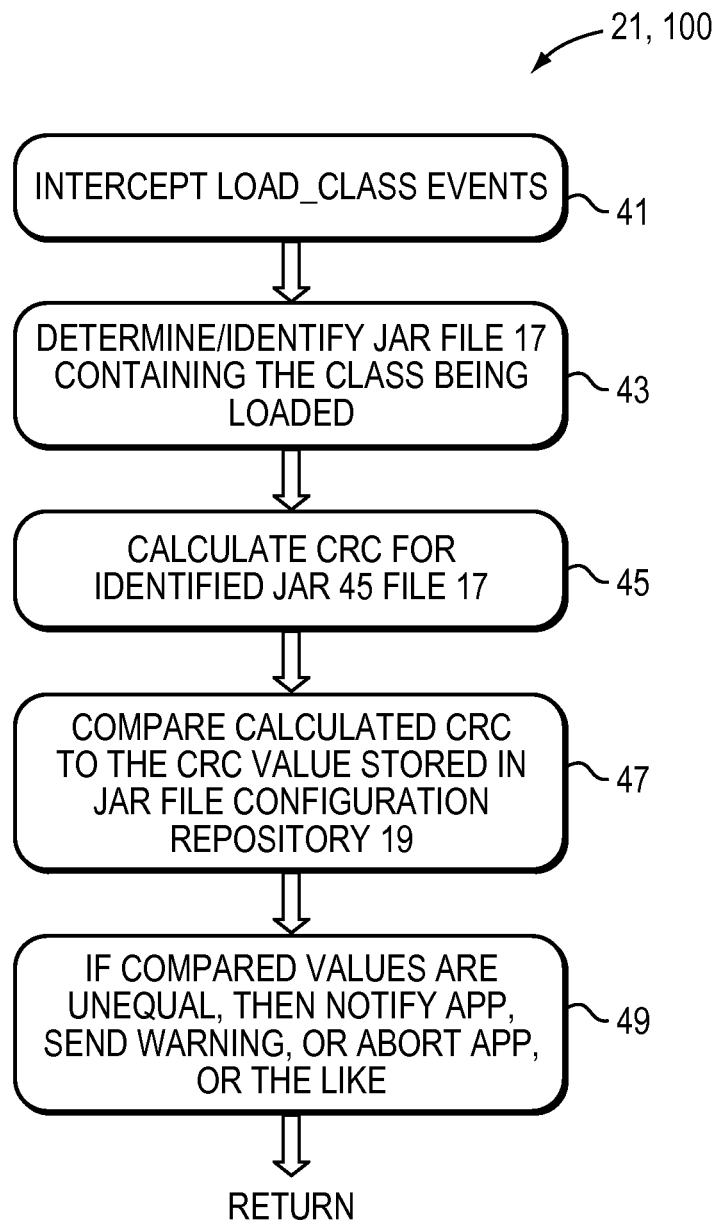
FIG. 3 is a flow diagram of embodiments dynamically ensuring that JAR files used by a Java application are exactly the correct ones and do not differ among themselves.

Referring now to FIG. 3, shown is the invention method for dynamically ensuring that the JAR files 17 used by a Java application 15 are exactly the correct ones and have been uniformly updated (i.e., do not differ among themselves). Responsive to a class being loaded into a Java application 15 (i.e., the JVM 13), step 41 intercepts each class that is loaded into the JVM 13. Step 41 may be implemented for example by an agent 23 registered with each JVM 13 of an application 15 and defined using the JRE Instrumentation interface (API).

Next step 43/Jar version detector 21 determines the JAR file 17 containing the class being loaded, and step 45 calculates the CRC for the identified JAR file 17. Known or common techniques accomplish the operations of steps 43 and 45.

Step 47/Jar version detector 21 compares the calculated CRC (results of step 45) to the CRC value stored in the Jar file configuration repository 19. If the compared values are unequal (at step 49), then the Jar version detector 21 notifies the application 15, sends a warning to the user, and/or aborts the application 15, or the like. Notifier and warning technology may be employed.

This routine (steps 41, 43, 45, 47 and 49 of FIG. 3) is repeated for each class that is loaded into the subject Java application 15 by a JVM 13.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While this invention has been particularly shown and described with references to example embodiments thereof, it will be understood by those skilled in the art that various changes in form and details may be made therein without departing from the scope of the invention encompassed by the appended claims.

For example, embodiments of the present invention do not instrument any Java class. Instead, embodiments use the JVM Instrumentation API to intercept any class that is being loaded into the virtual machine and retrieve the corresponding or surrounding JAR file. Then embodiments perform additional processing checking consistency of each identified JAR file. In this way, the present invention provides a method and system for dynamically ensuring that multiple copies of the same JAR file used by a Java application are exactly the correct ones and that updates have been uniformly performed on the multiple copies (or more generally that the copies do not differ from each other for any reason, including for example corruption).

What is claimed is:

1. A computer method providing consistency of JAVA application files, comprising:
   in a processor:
   automatically intercepting a class that is loaded into a subject JAVA application, the class having a respective JAVA Archive (JAR) file, said automatic intercepting identifying the respective JAR file and copies of the respective JAR file to check;
   computing cyclic redundancy check of the identified respective JAR file resulting in a computed CRC value of the respective JAR file;

comparing the computed CRC value to a CRC value of at least one other copy of the respective JAR file; and based on results of the comparing, determining consistency of multiple copies of the respective JAR file used by the subject JAVA application and alerting a user when the multiple copies of the respective JAR file are determined to be inconsistent, such that the method dynamically ensures consistency of the subject JAVA application file, wherein the determining consistency includes exact sameness of the multiple copies of the respective JAR file, such that the multiple copies of the respective JAR file correspond to a same version.

2. A method as claimed in claim 1, wherein the subject JAVA application is composed by multiple running JAVA virtual machines, different JAVA virtual machines referencing different copies of the same respective JAR file.

3. A method as claimed in claim 1, wherein the step of automatically intercepting is applied to each class that is loaded into the subject JAVA application, each class having a respective JAR file.

4. A method as claimed in claim 1, wherein the CRC value of the one other copy of the respective JAR file is stored in a repository; and the step of comparing looks up the stored CRC value in the repository, and compares the computed CRC value to the stored CRC value as looked-up in the repository.

5. A method as claimed in claim 1, wherein the step of determining consistency determines when the multiple copies of the respective JAR file are inconsistent and aborts the subject JAVA application.

6. A method as claimed in claim 1, wherein the step of determining consistency determines when the multiple copies of the respective JAR file are inconsistent and notifies the subject JAVA application.

7. A method as claimed in claim 1, wherein:

comparing the computed CRC value is with respect to a pre-specified CRC value, the CRC value of the at least one other copy of the respective JAR file being the pre-specified CRC value.

8. A method as claimed in claim 1, wherein comparing the computed CRC value is relative to CRC values of the multiple copies of the respective JAR file.

9. A method as claimed in claim 1, wherein the step of determining consistency further provides immediate detection of updates having been uniformly performed on the multiple copies of the respective JAR file.

10. A method as claimed in claim 1, wherein the step of determining consistency further provides immediate detection of corruption of at least one of the multiple copies of the respective JAR file.

* * * * *